Jan. 20, 1970   J. L. MALLAS ETAL   3,490,093
MEAT PATTY MACHINE
Filed Aug. 16, 1967   3 Sheets-Sheet 1
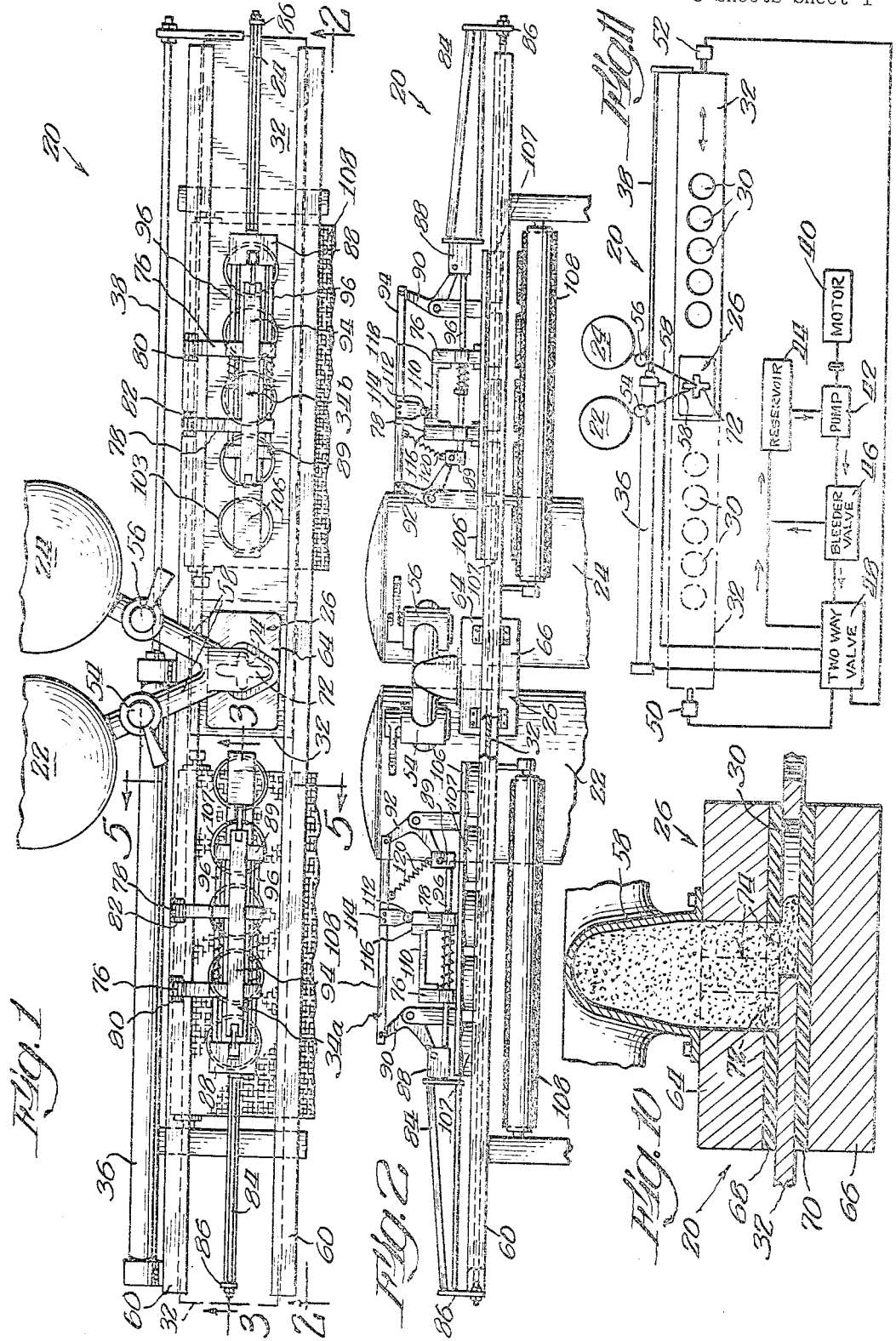

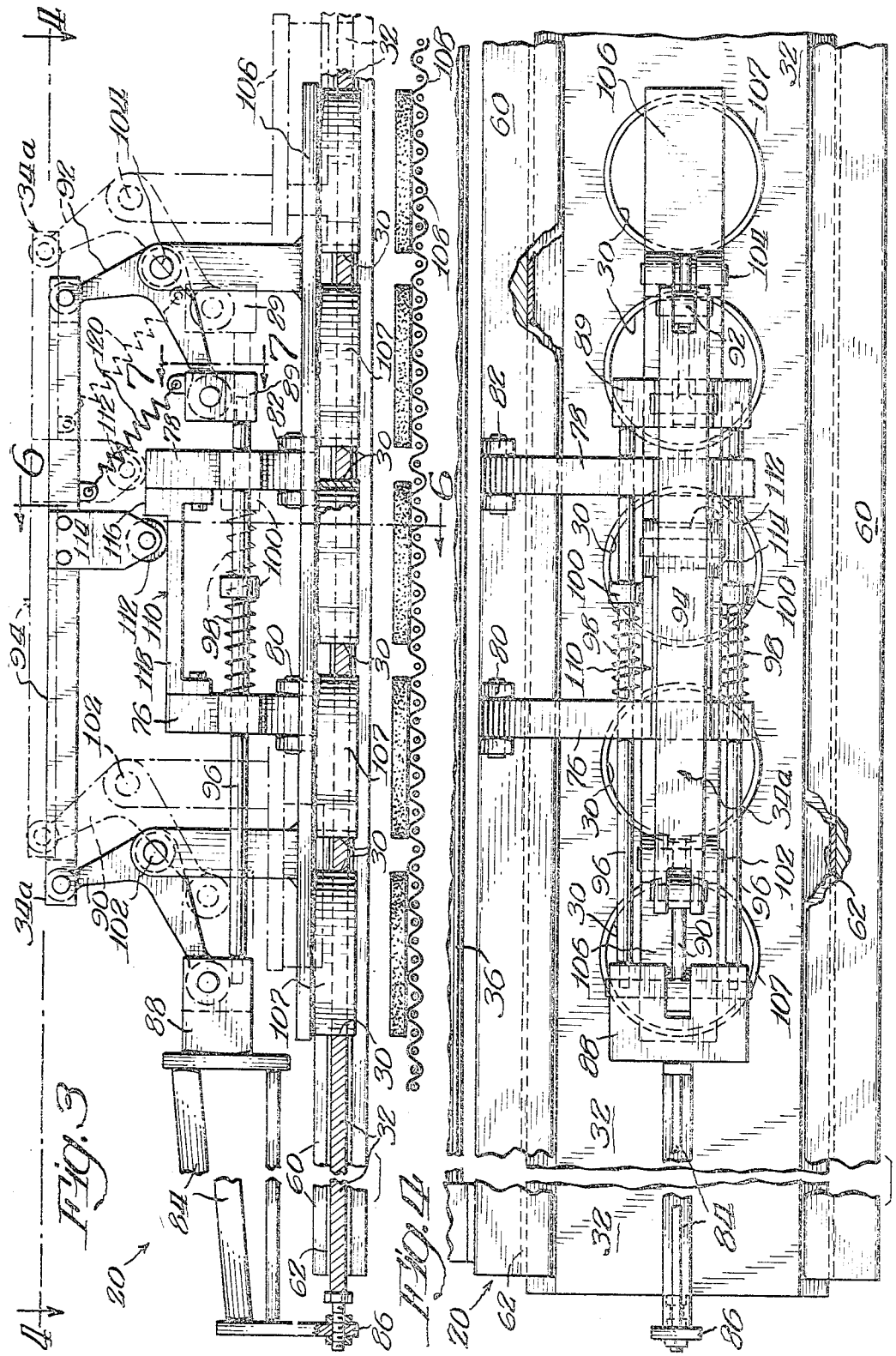

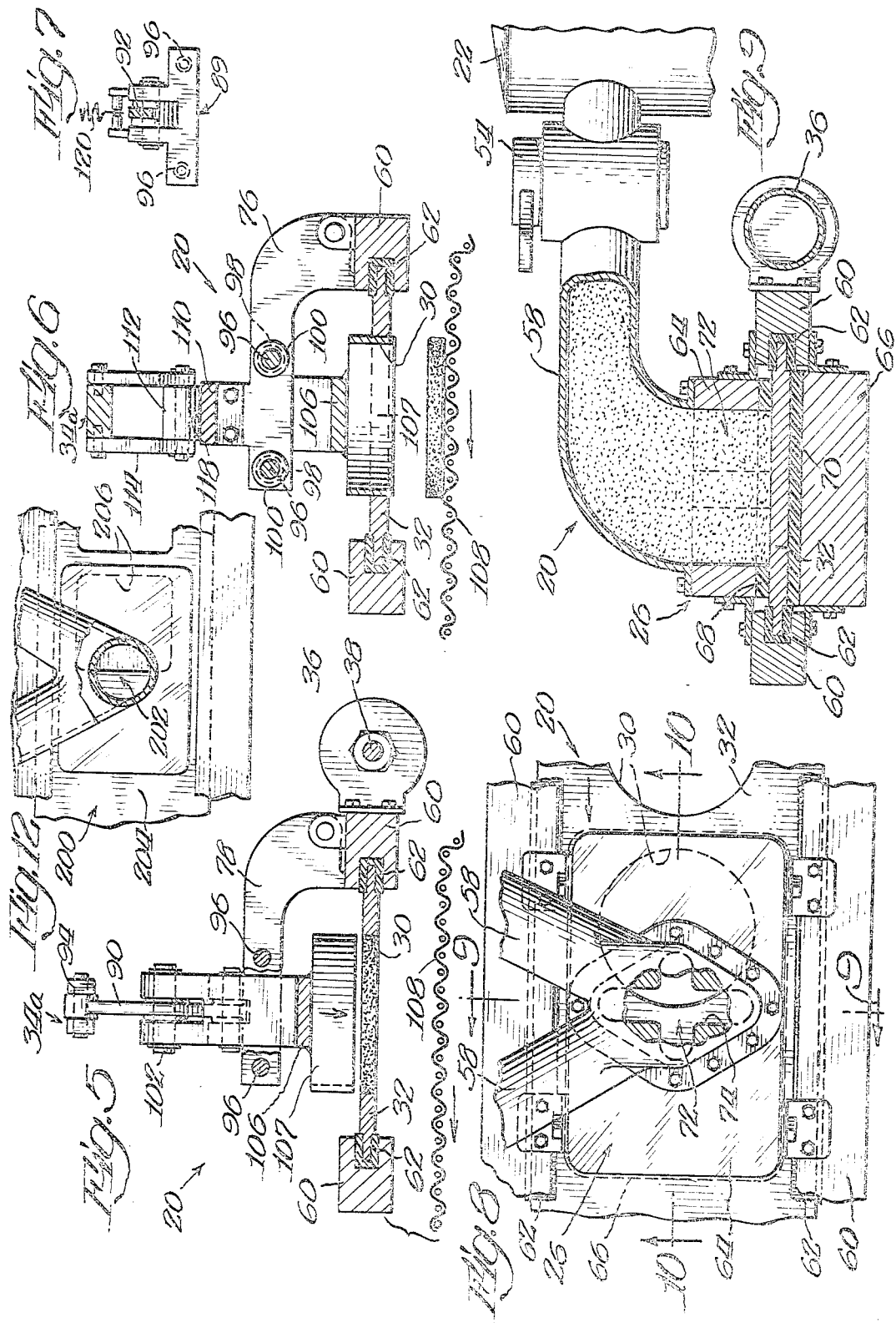

United States Patent Office 3,490,093
Patented Jan. 20, 1970

3,490,093
MEAT PATTY MACHINE
Jay L. Mallas, Downers Grove, Ill., Clay Earnest Hawkins, Springfield, Mo., and Bernard P. Menzyk, Chicago, Ill., assignors to Frigidmeats, Inc., Chicago, Ill., a corporation of Illinois
Filed Aug. 16, 1967, Ser. No. 661,003
Int. Cl. A22c 7/00
U.S. Cl. 17—32    4 Claims

ABSTRACT OF THE DISCLOSURE

Apparatus for high speed production of ground meat patties including a movable mold plate having meat patty defining apertures, and extrusion means having a restricted orifice. The apertures in the mold plate are filled by the extrusion means with ground meat under pressure in an irregular meat grain orientation to provide a meat patty which shrinks evenly during cooking. Ejection means are provided for removing the meat patties from the apertures in the mold plate. The ejection means are mechanically operated by the mold plate and moved with the mold plate during only a portion of the mold plate movement without interruption of the mold plate movement.

Introduction

The present invention relates to an apparatus for automatically producing fully formed ground meat patties, having even dimensional shrinkage during cooking, at a high rate of production with a reliable and sanitary structure.

Ground meat products have characteristics differing from normal aggregate or particulate materials. The meat product, even after it is well ground, contains elongate meat fibers. It is not uncommon for these thread-like fibers to extend in length to over one inch, even though the meat is ground to much smaller particulate dimensions. During the cooking process, these meat fibers undergo a substantial reduction in overall length and this reduction in length causes substantial dimensional changes in the overall mass of the meat patty.

It is known that if the meat fibers in the meat patty are maintained in a random orientation the shrinkage forces exerted by the fibers during cooking will counteract or cancel one another so that no externally visible dimensional distortion will occur in the cooked meat patty. However, if in a significant portion of the meat patty there is a departure from a random orientation, i.e. a preponderance of meat fiber grains which are linearized in a given dimension, the meat patty which is produced will become visibly distorted after it is cooked. For example, a round patty may become visibly oblong when cooked which would seriously affect its saleability. This alignment is believed to be due to the passage of the ground meat through various restrictions in the machinery by the normal patty molding process itself. The normal filling or wiping of an aperture in a mold plate to form a meat patty causes considerable meat fiber alignment.

The present invention overcomes the above mentioned uneven patty shrinkage problems by providing an apparatus in which an irregular random meat grain orientation is automatically induced in the meat patty product. Further, the apparatus of the invention provides a high speed and accurate patty production with a simple yet effective apparatus including an ejection means for ejecting the ground meat patties from apertures in a reciprocal mold plate while the mold plate is moving.

Further objects, features and advantages of the invention pertaining to the particular arrangement and structure whereby the above mentioned aspects of the invention are attained. The invention will be better understood by reference to the following description and the drawings forming a part thereof, which are substantially to scale, wherein:

FIGURE 1 is a plan view of an exemplary apparatus for producing ground meat patties in accordance with the present invention;

FIGURE 2 is a front elevational view of the embodiment of FIGURE 1;

FIGURE 3 shows an enlarged portion of FIGURE 2 illustrating the patty ejection means;

FIGURE 4 is a plan view of the portion of the embodiment of FIGURE 1 illustrated in FIGURE 3;

FIGURE 5 is a cross-sectional view taken along the plane 5—5 of FIGURE 3 showing a knockout in its raised position;

FIGURE 6 is a cross-sectional view taken along the plane 6—6 of FIGURE 3;

FIGURE 7 is a cross-sectional view taken along the plane 7—7 of FIGURE 3;

FIGURE 8 shows an enlarged portion of FIGURE 1 illustrating the extrusion means;

FIGURE 9 is a cross-sectional view taken along the plane 9—9 of FIGURE 8;

FIGURE 10 is a cross-sectional view taken along the plane 10—10 of FIGURE 8;

FIGURE 11 is a schematic view of the embodiment of FIGURE 1 particularly illustrating the hydraulic drive system therefor; and FIGURE 12 shows an alternative embodiment of the embodiment of FIGURE 1.

Description of the exemplary embodiments

In FIGURES 1 through 11 there is shown a machine 20 for producing ground meat patties in accordance with the present invention. Referring particularly to FIGURE 11, wherein the machine 20 is illustrated schematically, the machine 20 preferably includes two tanks 22 and 24 supplying ground meat under pressure to an extrusion means 26. The extrusion means 26 has a restricted orifice adapted to fill meat patty defining apertures 30 in a reciprocally movable mold plate 32 with ground meat having an irregular meat grain orientation. The molded patties are then removed from the mold plate 30 by ejection means 34 comprised of units 34a and 34b.

The preferred drive arrangement for the patty machine 20 is an all hydraulic system utilizing reliable conventional components. The hydraulic drive provides high speed but smooth operation of the reciprocal movement of the mold plate 32, and accurate speed control. Referring to FIGURE 11, it may be seen that the mold plate 32 is mounted for reciprocal movement through the extrusion means 26. A long stroke hydraulic cylinder 36 is connected adjacent to and parallel the direction of movement of the mold plate 32. The end of the piston rod 38 is connected to one end of the mold plate 32 to reciprocally drive it. The hydraulic system includes a conventional motor 40, a pump 42 and a reservoir 44. A bleeder valve 46 is provided to control the speed of operation of the hydraulic cylinder 36. The output of the bleeder valve 46 is applied to a reversible or two-way valve 48 which in turn has its outputs connected to opposite ends of the hydraulic cylinder 36 to supply hydraulic fluid thereto. The two-way valve 48 is preferably electrically actuated by means of switches 50 and 52 as is shown in FIGURE 11. The switches 50 and 52 are positioned at the desired extreme positions of the movement of the mold plate 32 and adapted to be contacted and actuated by the end of the mold plate.

As the mold plate approaches its extreme right hand extension it engages the switch 52 which actuates the two-way valve 48 and thereby reverses the flow of hydraulic fluid between the respective ends of the hydraulic cylinder 36. Thus, the hydraulic cylinder 36 immediately reverses its direction of drive. The mold plate is then moved continuously and smoothly in the opposite direction to its opposite extreme position. At this point the switch 50 is engaged which operates the two-way valve 48 to reverse the mold plate movement. The reversal of movement of the mold plate is not critical as to its position or timing since, as will be described, there is no requirement that the mold plate 32 be stopped or aligned to remove the meat patties from the apertures 30 in the mold plate.

Considering now the means for supplying the ground meat under pressure in the meat patty machine 20, the tans 22 and 24 may be of the general type utilized for sausage stuffing machines. However, a constant regulated pressure is desirable, and the tanks are preferably provided with pneumatic pistons therein for exerting a constant pressure against the contained ground meat. A pressure of 6 to 20 p.s.i. is preferable. Two tanks are provided, each with appropriate discharge valves 54 and 56 respectively, for alternately feeding meat from one tank or the other so that a continuous supply of ground meat under pressure may be provided.

The entire connection path between the tanks 22 or 24 and the extrusion means 26 is preferably of a large diameter and as short as possible so as to avoid any unnecessary restrictions of the moving ground meat which would tend to cause meat fiber alignment. Preferably the inlet tubing 58 connecting with the extrusion means 26 has a minimum internal cross-sectional area which is greater than that of the discharge orifice in the extrusion means.

Considering the mold plate 32, and referring to FIGURES 5 or 6 for example, it may be seen that the mold plate is preferably a thick elongated rigid planar surfaced plate slidably mounted at its edges within a framework 60. The outer edges of the mold plate 32 are slidably mounted within continuous raceways 62 of nylon or other suitable bearing material on the framework 60, which raceways provide accurate lateral positioning and smooth reciprocal movement of the mold plate 32. It will be appreciated that the thickness of the central portion of the mold plate will vary depending upon the thickness of the patty to be formed as the patty thickness is determined by the thickness of the mold plate.

The mold plate 32 is provided with meat patty defining apertures 30 of a suitable desired number and shape. Five are shown here by way of example. The configuration and size of the apertures 30 will of course depend upon the desired configuration and lateral dimensions of the meat patty. The mold plates are rapidly interchangeable.

Considering the extrusion means 26, which may be seen for example in FIGURE 9, this unit preferably includes a top plate 64 and a bottom plate 66 between which the mold plate is slidably sandwiched. A nylon surface 68 is preferably provided on the top plate 64 to provide a continuously abutting slidable bearing surface against the top of the mold plate 32. A corresponding nylon surface 70 is preferably provided on the bottom plate 66. The continuous surface engagement of the mold plate thus provided confines the ground meat applied through the extrusion means 26 to filling only the apertures 30 as the apertures 30 pass through the extrusion means.

The top plate 64 and its nylon surface 68 have a restricted orifice 72 extending therethrough. The orifice 72 is fed ground meat under pressure through the tubing 58. As may be seen from FIGURES 8 and 10, the ground meat is extruded into and fills the aperture 30 as each aperture 30 passes under the orifice 72.

Substantially the entire length of the mold plate 32 passes through the extrusion means 26 in each direction of its reciprocal movement. All of the meat filled apertures 30 are emptied simultaneously by the ejection means 34 at each side of the machine. When the movement of the mold plate is reversed, all of the empty apertures 30 pass through the extrusion means 26 where the apertures are all refilled. The new patties thus formed are all removed on the opposite side of the machine. Thus, it may be seen that in each cycle of the mold plate two ground meat patties are produced from each aperture 30.

Considering in greater detail the filling of the apertures 30 with the ground meat through the orifice 72, it may be seen that the particular orifice 72 shown herein has a cruciform configuration. However, it will be appreciated that other orifice configurations may be provided which would achieve the function and result described herein, as for example the orifice disclosed in the embodiment of FIGURE 12. It may be seen that the orifice 72 has at least one dimension which is substantially less than the corresponding dimenion of the meat patty defining aperture 30 in the mold plate 32. Referring to FIGURE 8, it may be seen that as the mold plate 32 moves from right to left the first movement of ground meat into the aperture 30 is through the narrow central slot 74. The width of the slot 74 is considerably less than that of the aperture 30 and the ground meat is therefore extruded into the aperture 30 from a plurality of different directions so as to impart a random meat grain orientation. Further, as the aperture 30 continues to move past the orifice 72 and exposes different areas of the orifice 72, the direction of movement of meat into the aperture 30 changes and thereby provides further mixing or disorientation of the meat. Thus, the overall effect is to provide a patty with an irregular or random meat fiber orientation at the completion of the filling of the aperture 30. Preferably, the cross-sectional area or opening of the orifice 72 is smaller than that of the aperture 30.

It may be seen that the upper and lower surfaces of the meat patty formed in the filled aperture 30 are subject to equal surface effects in the movement of the patty through the extrusion means 26. This is because both abutting surfaces 68 and 70 are substantially identical and fixed and because the patty moves therebetween in only one direction. Thus, any linearization of the meat grains in the surface of the patty is equal for both surfaces of the patty.

Considering in detail the ejection means 34, the arrangement disclosed herein provides high speed and reliable operation. The mold plate 32 does not have to stop or be brought into an aligned position with the ejection means. The ejection means 34 is specifically adapted for the reciprocal movement mold plate 32 of the invention. It is normally totally disconnected from the mold plate 32, and the entire operation of the ejection means 34 is preferably accomplished only during the last few inches of the mold plate movement as the mold plate approaches its extreme position at each end. The ejection means 34 is powered solely by the movement of the mold plate and in fact assists in the reversing of the direction of the mold plate 32 by providing a resilient resistance to the mold plate at its extreme positions.

It may be seen that the ejection means 34 is a pair of substantially identical but completely independent units 34a and 34b mounted at each side of the machine. Considering the ejection unit 34a illustrated in detail in FIGURES 3 through 7, it may be seen that this entire unit is mounted to and supported by two parallel fixed arms 76 and 78. The arms 76 and 78 are respectively pivotally fixed to the framework 60 at hinges 80 and 82. This allows the entire unit 34a to be tilted upwardly away from the mold plate 32 to allow easy cleaning and repair. All of the remaining components of the ejection unit 34a are mounted to and supported by two arms 76 and 78 and are adapted to move with the mold plate.

The ejection means 34a is actuated only by an engagement arm 84 which has a screw adjustable stop or projection 86 positioned in the path of the mold plate near the extreme position of the mold plate. When the projection 86 is engaged by the end of the mold plate 32, it may be seen that the engagement arm 84 is pulled along by the mold plate at exactly the same speed as the mold plate and thus exerts a corresponding movement on the ejection unit 34a.

The end of the engagement arm 84 opposite the projection 86 is fixed to a connecting block 88 which forms a lower corner of a parallelogram linkage. The sides or generally vertical members of the parallelogram are formed by the similar side arms 90 and 92. The top of the parallelogram is defined by a horizontal top arm 94 pivotally connected between the upper ends of the arms 90 and 92. The bottom of the parallelogram is defined by an integral pair of elongated rods 96. One end of the pair of rods 96 is fixed to the connecting block 88 and the other end to a connecting block 89. The connecting blocks are respectively pivotally connected to the lower ends of the side arms 90 and 92.

It may be seen that the pair of rods 96 are horizontally axially slidable through correspondingly dimensioned apertures in both the arms 76 and 78. This connection supports the entire parallelogram linkage. A pair of compression coil springs 98 are respectively mounted on and act upon the pair of rods 96. One end of the springs 98 abuts the inside of the arm 76 and the other end abuts collars 100 fastened to the rods 96. The collars 100 normally abut the inside of the arm 78 and thereby limit the movement that the springs 98 may impart to the rods 96. When the ejection unit 34a is actuated, the movement of the engagement arm 34 with the mold plate correspondingly moves the rods 96 and thus compresses the springs 98. On the return stroke of the mold plate, the force of the springs 98 pulls the pair of rods 96 back to their normal positions and thus automatically returns the ejection means to its normal position.

It may be seen that the side arms 90 and 92 each have a central portion which extends horizontally a substantial distance from their lower ends. Thus, relative movement within the parallelogram linkage causes a substantial vertical movement of these central portions. Pivotal connections 102 and 104 are provided at the central portions of the respective side arms, and from these pivotal connections 102 and 104 there is suspended a generally U-shaped rigid knockout frame 106. Fastened along the horizontal or bottom portion of this knockout frame 106 are a plurality of tubular knockouts 107. The knockouts 107 are adapted to move reciprocally vertically into and out of the meat filled apertures 30 in the mold plate to push the meat patties out of the apertures and to thus allow the meat patties to drop onto an underlying conveyor chain 108.

It will be appreciated that for a constant vertical spacing between the top arm 94 and the rods 96 the parallelogram linkage is fixed and movement of the knockout frame 106 and its knockouts 107 is purely horizontal with the mold plate. This vertical spacing is controlled by a cam surface 110 fixed between the arms 76 and 78 and by a cylindrical nylon roller 112 fixed to the top arm 94 by means of a downwardly projecting roller bracket 114. It may be seen that the cam surface 110 has two horizontal levels, an upper level 116 and a lower level 118. In the normal position the roller 112 is on the upper level 116. In this position, the top arm 94 is raised which correspondingly raises the pivotal connections 102 and 104 and the knockout frame 106 so that the knockouts 107 are raised out of the path of the mold plate.

Considering the operation of the ejection unit 34a, it may be seen that during the entire time the mold plate engages and moves forward the engagement arm 84 the entire parallelogram linkage, including the attached roller 112 and knockouts 107, is equally moved. As the roller 112 passes the edge of the upper level 116 of the cam surface 110 it rapidly drops down to the lower level 118. This is assisted by a spring 120 pulling downwardly against the top arm 94. The dropping of the roller 112 causes the knockout frame 106 to vertically drop. Thus, the knockouts 107 enter the apertures 30 and remove the meat patties therefrom. The lower level 118 of the cam surface 110 is generally horizontal and thus maintains the parallelogram linkage in a second stable position. The parallelogram linkage and the accompanying connected knockouts 107 thus continue to move along with the mold plate 32 in exactly the same speed and direction as the mold plate.

When the mold plate reverses direction, the above described movement is reversed. The roller 112 moves back from the lower level 118 to the upper level 116 of the cam surface 110 and thus raises the knockouts 107 out of the apertures 30. When the collars 100 come into engagement with the arm 78, the movement of the parallelogram linkage stops and the mold plate disengages from the projection 86 on the engagement arm 84.

The above described structure provides a very rapid and accurate movement of the knockouts 107 in and out of the apertures 30. The entire operation of the ejection unit 34a may be accomplished for example in only approximately the last three inches of movement of the mold plate which may have a total movement of over forty inches. The accuracy and timing of the ejection operation is independent of the speed of the mold plate. The screw stop adjustment in the projectures 30, and this is the only adjustment required.
initial alignment of the knockouts 107 with the apertures 30, and this is the only adjustment required.

Considering the embodiment of FIGURE 12, there is shown therein a portion of a patty machine 200. The patty machine 200 is preferably identical in all respects with the patty machine 20 other than that shown herein. The patty machine 200 differs in that it has a small round orifice 202 rather than the cruciform-shaped orifice 72 of the patty machine 20. Also, the mold plate 204 in the meat patty machine 200 is shown with a rectangular meat patty defining aperture 206. It may be seen that the aperture 206 preferably has dimensions which are substantially larger than those of the orifice 202.

The apparatus described herein is presently considered to be preferred; however, it is contemplated that further variations and modifications within the purview of those skilled in the art can be made herein without departing from the spirit and scope of the invention.

What is claimed is:

1. Apparatus for automatically producing ground meat patties comprising:
   supply means for supplying ground meat under pressure,
   a reciprocally movable planar mold plate having a plurality of meat patty defining apertures therein,
   extrusion means having an orifice communicating with said apertures in said mold plate for filling said apertures with ground meat in an irregular meat fiber orientation to form meat patties,
   means for reciprocally moving said mold plate past said extrusion means,
   and ejection means for ejecting ground meat patties from said apertures in said mold plate,
   said ejection means including knockout means movable into and out of said apertures, and
   said ejection means including means for moving said knockout means into and out of said aperture and simultaneously moving said knockout means in the same direction and at the same speed as said mold plate during only a portion of the movement of said mold plate.

2. The apparatus of claim 1 wherein said ejection means includes engagement means for intermittently mechanically engaging said mold plate and moving said knockout means along with said mold plate.

3. The apparatus of claim 1 wherein said ejection means includes camming means for mechanically camming said moving knockout means into and out of said mold plate.

4. The apparatus of claim 3 wherein
said engagement means has an adjustable position catch positioned to be engaged by said mold plate adjacent an extreme position of said mold plate,
said engagement means provides the sole motive power for said ejection means,
said ejection means includes a parallelogram linkage connected to said engagement means and said knockout means and moveable with said mold plate, and
said linkage has upper and lower members with a spacing therebetween controlled by said camming means.

References Cited

UNITED STATES PATENTS

| | | | |
|---|---|---|---|
| 1,473,590 | 11/1923 | Wallace | 17—32 |
| 2,324,202 | 7/1943 | Felton | 17—32 |
| 2,706,830 | 4/1955 | Holly | 17—32 |
| 2,757,411 | 8/1956 | Condon | 17—32 |
| 3,177,524 | 4/1965 | Gause | 17—32 |
| 3,416,187 | 12/1968 | Chartier | 17—32 |

LUCIE H. LAUDENSLAGER, Primary Examiner (5/69)

CERTIFICATE OF CORRECTION

Patent No. 3,490,093        Dated January 20, 1970

Inventor(s) Jay L. Mallas, Clay E. Hawkins and Bernard P. Menzyk

It is certified that error appears in the above-identified patent and that said Letters Patent are hereby corrected as shown below:

Column 3, line 16, change "tans" to ---tanks---

Column 4, line 17, change "dimenion" to --dimension--

Column 6, line 25, after projec- --insert-- "tion 86 on the engagement arm 84 allows very accurate initial alignment of the knockouts 107 with the aper-"

Column 6, lines 28 and 29, delete

Column 6, line 74, change "1" to --2--

SIGNED AND
SEALED
JUL 28 1970

(SEAL)
Attest:

Edward M. Fletcher, Jr.
Attesting Officer

WILLIAM E. SCHUYLER, JR.
Commissioner of Patents